(12) United States Patent
Yao et al.

(10) Patent No.: US 12,190,628 B2
(45) Date of Patent: Jan. 7, 2025

(54) FINGERPRINT IDENTIFICATION MODULE, METHOD FOR MANUFACTURING FINGERPRINT IDENTIFICATION MODULE, DISPLAY SUBSTRATE AND DISPLAY DEVICE

(71) Applicant: BOE Technology Group Co., Ltd., Beijing (CN)

(72) Inventors: Nianqi Yao, Beijing (CN); Lubin Shi, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 560 days.

(21) Appl. No.: 17/431,636

(22) PCT Filed: Feb. 9, 2021

(86) PCT No.: PCT/CN2021/076187
§ 371 (c)(1),
(2) Date: Aug. 17, 2021

(87) PCT Pub. No.: WO2021/164641
PCT Pub. Date: Aug. 26, 2021

(65) Prior Publication Data
US 2022/0100982 A1 Mar. 31, 2022

(30) Foreign Application Priority Data
Feb. 18, 2020 (CN) .......................... 202010098804.5

(51) Int. Cl.
*H01L 27/144* (2006.01)
*G06F 21/32* (2013.01)
(Continued)

(52) U.S. Cl.
CPC .......... *G06V 40/1318* (2022.01); *G06F 21/32* (2013.01); *H01L 27/1443* (2013.01); *H01L 27/14643* (2013.01)

(58) Field of Classification Search
CPC . G06V 40/1318; G06F 21/32; H01L 27/1443; H01L 27/14643;
(Continued)

(56) References Cited

U.S. PATENT DOCUMENTS

| 10,540,936 | B1 | 1/2020 | Kumar et al. |
| 2015/0053969 | A1 | 2/2015 | Ito et al. |

(Continued)

FOREIGN PATENT DOCUMENTS

| CN | 104037179 A | 9/2014 |
| CN | 104205341 A | 12/2014 |

(Continued)

OTHER PUBLICATIONS

CN 202010098804.5 second office action.
(Continued)

*Primary Examiner* — Shahed Ahmed
(74) *Attorney, Agent, or Firm* — IPro, PLLC

(57) ABSTRACT

A fingerprint identification module, a method for manufacturing the fingerprint identification module, a display substrate and a display device are provided. The fingerprint identification module includes a TFT, a photosensitive sensor, and a connection electrode configured to connect the TFT to the photosensitive sensor; the TFT includes an active layer; the active layer and the connection electrode are formed through a same semiconductor layer pattern, the semiconductor layer pattern includes a first semiconductor pattern and a second semiconductor pattern, the first semiconductor pattern is used as the active layer, and the second
(Continued)

semiconductor pattern is subjected to conductor-formation treatment and used as the connection electrode.

14 Claims, 5 Drawing Sheets

(51) Int. Cl.
*G06V 40/13* (2022.01)
*H01L 27/146* (2006.01)

(58) Field of Classification Search
CPC . H01L 29/66742–6678; H01L 29/786–78696; H01L 27/12–13; H01L 29/04–045; H01L 29/16–1608; H01L 27/14678; H10K 10/46–491

See application file for complete search history.

(56) References Cited

U.S. PATENT DOCUMENTS

| | | |
|---|---|---|
| 2015/0295006 A1 | 10/2015 | Chen et al. |
| 2018/0277660 A1 | 9/2018 | Liu |
| 2018/0285617 A1 | 10/2018 | Liu et al. |
| 2019/0019813 A1* | 1/2019 | Ren ..................... H01L 27/1225 |
| 2020/0273923 A1 | 8/2020 | Liu et al. |
| 2021/0126064 A1 | 4/2021 | Ju |
| 2022/0165827 A1* | 5/2022 | Xu ..................... H10K 59/1201 |

FOREIGN PATENT DOCUMENTS

| | | |
|---|---|---|
| CN | 106129069 A | 11/2016 |
| CN | 106653767 A | 5/2017 |
| CN | 106876332 A | 6/2017 |
| CN | 109698224 A | 4/2019 |
| CN | 110046610 A | 7/2019 |
| CN | 111275001 A | 6/2020 |
| KR | 20190092661 A | 8/2019 |

OTHER PUBLICATIONS

PCT/CN2020/076187 international search report and written opinion.
CN 202010098804.5 first office action.
PCT/CN2021/076187 international search report and written opinion.

* cited by examiner

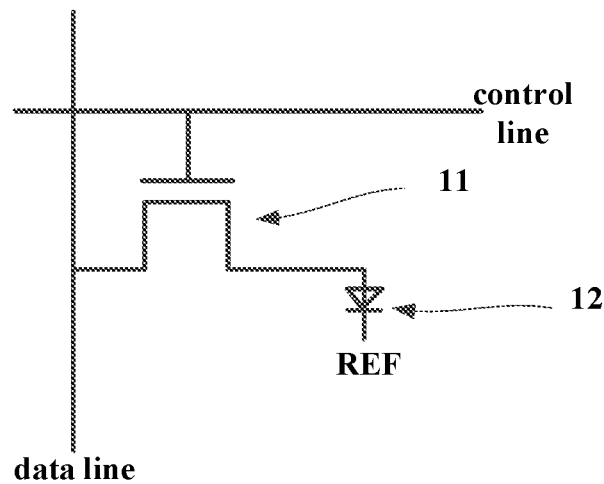
Fig.1
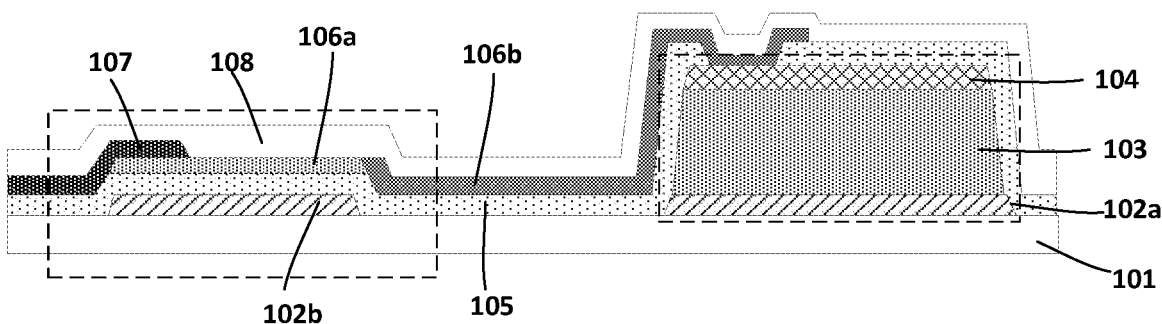
Fig.2
Fig.3

FINGERPRINT IDENTIFICATION MODULE, METHOD FOR MANUFACTURING FINGERPRINT IDENTIFICATION MODULE, DISPLAY SUBSTRATE AND DISPLAY DEVICE

CROSS-REFERENCE TO RELATED APPLICATION

This application is the U.S. national phase of PCT Application No. PCT/CN2021/076187 filed on Feb. 9, 2021, which claims a priority of the Chinese patent application No. 202010098804.5 filed in China on Feb. 18, 2020, which are incorporated herein by reference in their entireties.

TECHNICAL FIELD

The present disclosure relates to the field of display technology, in particular to a fingerprint identification module, a method for manufacturing the fingerprint identification module, a display substrate and a display device.

BACKGROUND

Full-screen products are currently available in the market, so there is an urgent need to provide a corresponding full-screen fingerprint identification and touch technology.

In the related art, during the manufacture of a fingerprint identification module, more than ten masks are used, leading to a complex manufacture process and high manufacture cost.

SUMMARY

An object of the present disclosure is to provide a fingerprint identification module, a method for manufacturing the fingerprint identification module, a display substrate and a display device, so as to solve the above-mentioned problem.

In one aspect, the present disclosure provides in some embodiments a fingerprint identification module, including a thin film transistor (TFT), a photosensitive sensor, and a connection electrode configured to connect the TFT to the photosensitive sensor; the TFT includes an active layer; the active layer and the connection electrode are formed through a same semiconductor layer pattern, the semiconductor layer pattern includes a first semiconductor pattern and a second semiconductor pattern, the first semiconductor pattern is used as the active layer, and the second semiconductor pattern is subjected to conductor-formation treatment and used as the connection electrode.

In a possible embodiment of the present disclosure, the photosensitive sensor includes a first electrode, a PIN layer and a second electrode, wherein the first electrode, the PIN layer and the second electrode are laminated one on another on a substrate sequentially in that order, and the connection electrode is lapped onto the second electrode.

In a possible embodiment of the present disclosure, the fingerprint identification module further includes: a gate insulation layer, wherein a portion of the gate insulation layer covers a surface of the second electrode distal to the first electrode; and a via-hole, wherein the via-hole is formed in the portion of the gate insulation layer and penetrates through the gate insulation layer, wherein the connection electrode is in contact with the second electrode through the via-hole.

In a possible embodiment of the present disclosure, the connection electrode is a transparent electrode.

In a possible embodiment of the present disclosure, the photosensitive sensor includes a first electrode and a PIN layer laminated one on another on a substrate sequentially in that order, and the connection electrode is a transparent electrode and reused as a second electrode of the photosensitive sensor.

In a possible embodiment of the present disclosure, a portion of the connection electrode is arranged at a surface of the PIN layer distal to the first electrode.

In a possible embodiment of the present disclosure, the connection electrode is reused as a second electrode of the photosensitive sensor.

In a possible embodiment of the present disclosure, the TFT includes a gate electrode, and the gate electrode is arranged at a same layer, and made of a same material, as the first electrode of the photosensitive sensor.

In a possible embodiment of the present disclosure, the connection electrode is connected to the active layer and reused as a drain electrode of the TFT; or the connection electrode is connected to the active layer and the drain electrode of the TFT; or the connection electrode is separated from the active layer and connected to the drain electrode of the TFT.

In another aspect, the present disclosure provides in some embodiments a display substrate, including the above-mentioned fingerprint identification module.

In yet another aspect, the present disclosure provides in some embodiments a display device including the above-mentioned display substrate.

In still yet another aspect, the present disclosure provides in some embodiments a method for manufacturing a fingerprint identification module, the fingerprint identification module includes a TFT and a photosensitive sensor, and the method includes: forming a semiconductor layer pattern through a single patterning process, the semiconductor layer pattern including a first semiconductor pattern and a second semiconductor pattern, the first semiconductor pattern being used as an active layer of the TFT; and subjecting the second semiconductor pattern to conductor-formation treatment to form a connection electrode, the connection electrode being used to connect the TFT to the photosensitive sensor.

In a possible embodiment of the present disclosure, the method further includes, prior to forming the semiconductor layer pattern, forming a first electrode, a PIN layer and a second electrode of the photosensitive sensor on a substrate sequentially in that order, wherein the connection electrode is lapped onto the second electrode.

In a possible embodiment of the present disclosure, the method further includes: subsequent to forming the first electrode, the PIN layer and the second electrode of the photosensitive sensor sequentially on the substrate sequentially in that order, forming a gate insulation layer, wherein a portion of the gate insulation layer covers a surface of the second electrode distal to the first electrode; forming in the portion of the gate insulation layer a via-hole that penetrates through the gate insulation layer, wherein the connection electrode is in contact with the second electrode through the via-hole.

In a possible embodiment of the present disclosure, the connection electrode is a transparent electrode.

In a possible embodiment of the present disclosure, the method further includes, prior to forming the semiconductor layer pattern, forming a first electrode and a PIN layer of the photosensitive sensor on a substrate sequentially in that order, wherein the connection electrode is a transparent electrode and reused as a second electrode of the photosensitive sensor.

In a possible embodiment of the present disclosure, a portion of the connection electrode is arranged at a surface of the PIN layer distal to the first electrode.

In a possible embodiment of the present disclosure, the connection electrode is reused as a first electrode of the photosensitive sensor.

In a possible embodiment of the present disclosure, the method further includes, prior to forming the semiconductor layer pattern, forming a gate metal layer pattern, wherein the gate metal layer pattern includes a gate electrode of the TFT and the first electrode of the photosensitive sensor.

In a possible embodiment of the present disclosure, the method further includes: subsequent to forming the semiconductor layer pattern, forming a source/drain metal layer pattern, the source/drain metal layer pattern merely including a source electrode, the connection electrode being connected to the active layer and reused as a drain electrode of the TFT; or forming the source/drain metal layer pattern, the source/drain metal layer pattern including the source electrode and the drain electrode, the connection electrode being connected to the active layer and the drain electrode; or forming the source/drain metal layer pattern, the source/drain metal layer pattern including the source electrode and the drain electrode, the connection electrode being separated from the active layer and connected to the drain electrode.

BRIEF DESCRIPTION OF THE DRAWINGS

Through reading the detailed description hereinafter, the other advantages and benefits will be apparent to a person skilled in the art. The drawings are merely used to show the preferred embodiments, but shall not be construed as limiting the present disclosure. In addition, in the drawings, same reference symbols represent same members. In these drawings, FIG. 1 is a schematic view showing an equivalent circuit of a fingerprint identification module in related art;

FIG. 2 is a flow chart of a method for manufacturing a fingerprint identification module according to an embodiment of the present disclosure;

FIG. 3 is a schematic view showing the fingerprint identification module according to an embodiment of the present disclosure;

DETAILED DESCRIPTION

Figure 4:
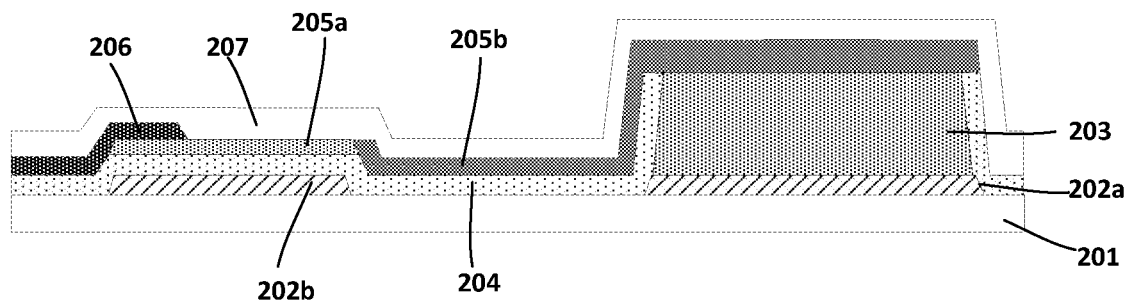
FIG. 4 is another schematic view showing the fingerprint identification module according to an embodiment of the present disclosure.

The present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

In the related art, usually a fingerprint identification module includes a TFT and a photosensitive sensor. As shown in FIG. 1, which is a schematic view showing an equivalent circuit of the fingerprint identification module, the fingerprint identification module includes a TFT 11 and a photosensitive sensor 12. A gate electrode of the TFT 11 is connected to a control line, and the control line is configured to control the TFT to be turned on. A source electrode of the TFT 11 is connected to a data line, a drain electrode of the TFT 11 is connected to an upper electrode of the photosensitive sensor 12, and a lower electrode of the photosensitive sensor 12 is connected to a reference voltage REF. When the TFT is turned on under the control of a signal from the control line, a current generated by the photosensitive sensor 12 is read by a data reading line, and then a fingerprint is identified in accordance with a size of the current. For example, the photosensitive sensor 12 is a PIN diode.

In the related art, the TFT needs to be connected to the photosensitive sensor through a connection electrode, and usually the connection electrode is manufactured through a separate masking process. Hence, too many masks are used, and it is adverse to the reduction in the manufacture cost of the fingerprint identification module.

In order to solve the above-mentioned problem, as shown in FIG. 2, the present disclosure provides in some embodiments a method for manufacturing a fingerprint identification module. The fingerprint identification module includes a TFT and a photosensitive sensor. The method includes: a step S1 of forming a semiconductor layer pattern, the semiconductor layer pattern including a first semiconductor pattern and a second semiconductor pattern, the first semiconductor pattern being used as an active layer of the TFT; and a step S2 of subjecting the second semiconductor pattern to conductor-formation treatment to form a connection electrode, the connection electrode being used to connect the TFT to the photosensitive sensor.

According to the embodiments of the present disclosure, the first semiconductor pattern serving as the active layer of the TFT and the second semiconductor pattern for forming the connection electrode are formed simultaneously through a single patterning process, so it is able to reduce the quantity of masks for manufacturing the fingerprint identification module, thereby to reduce the manufacture cost thereof.

In a possible embodiment of the present disclosure, prior to forming the semiconductor layer pattern, the method further includes S0a of forming a lower electrode, a PIN layer and an upper electrode of the photosensitive sensor on a substrate sequentially in that order, and the connection electrode is lapped onto the upper electrode.

As shown in FIG. 3, the lower electrode 102a, the PIN layer 103 and the upper electrode 104 of the photosensitive sensor are formed, and then the active layer 106a of the TFT and the connection electrode 106b are formed. The connection electrode 106b is lapped onto the upper electrode 104, so as to connect the TFT to the photosensitive sensor.

In the related art, during the manufacture of the fingerprint identification module, usually the TFT is formed, and then the photosensitive sensor is formed, so during the formation of the photosensitive sensor, the active layer of the TFT is probably damaged, and thereby a characteristic of the TFT is adversely affected.

In the embodiments of the present disclosure, during the manufacture of the fingerprint identification module, the photosensitive sensor is formed before a film layer of the TFT, e.g., the active layer is formed, so it is able to prevent the active layer from being damaged during the formation of the photosensitive sensor.

In the related art, such a scheme of connecting the photosensitive sensor to the TFT through a shield metal layer of the TFT as a lapping electrode has been presented. The shield metal layer also shields a portion of the photosensitive sensor while shielding the TFT, so a light-receiving area of the photosensitive sensor is reduced. In this way, a current generated by the photosensitive sensor is reduced, and thereby the sensitivity of the fingerprint identification module is adversely affected.

In a possible embodiment of the present disclosure, the semiconductor layer pattern is made of a transparent semiconductor material, so that the connection electrode is a transparent electrode. At this time, even when the connection electrode is lapped onto the upper electrode of the photosensitive sensor, the light-receiving area of the photosensitive sensor is not adversely affected.

In a possible embodiment of the present disclosure, the transparent semiconductor material is a metal oxide semiconductor material. When the active layer is made of the metal oxide semiconductor material, it is able to improve the characteristic of the TFT.

In a possible embodiment of the present disclosure, the connection electrode is a transparent electrode and reused as an upper electrode of the photosensitive sensor. Prior to forming the semiconductor layer pattern, the method further includes a step S0b of forming a lower electrode and a PIN layer of the photosensitive sensor, and the connection electrode is a transparent electrode and reused as the upper electrode of the photosensitive sensor.

As shown in FIG. 4, the lower electrode 202a and the PIN layer 203 of the photosensitive sensor are formed before an active layer 205a of the TFT and the connection electrode 205b are formed, and the connection electrode 205b is reused as the upper electrode of the photosensitive sensor.

In a possible embodiment of the present disclosure, the semiconductor layer pattern is made of a transparent metal oxide semiconductor material. When the active layer is made of the metal oxide semiconductor material, it is able to improve the characteristic of the TFT.

In the embodiments of the present disclosure, during the manufacture of the fingerprint identification module, the lower electrode and the PIN layer of the photosensitive sensor are formed before the active layer of the TFT and the connection electrode reused as the upper electrode of the photosensitive sensor are formed. As a result, it is able to omit a masking process for separately forming the upper electrode of the photosensitive sensor while preventing the active layer from being damaged during the formation of the photosensitive sensor, thereby to reduce the quantity of masks for the manufacture of the fingerprint identification module, the manufacture cost as well as a thickness of the fingerprint identification module.

In the embodiments of the present disclosure, the connection electrode is lapped onto the upper electrode of the photosensitive sensor, or reused as the upper electrode of the photosensitive sensor, and in some other embodiments of the present disclosure, the connection electrode is also connected to the lower electrode of the photosensitive sensor or reused as the lower electrode of the photosensitive sensor, which will be described hereinafter.

In a possible embodiment of the present disclosure, the connection electrode is reused as the lower electrode of the photosensitive sensor.

Figure 5:
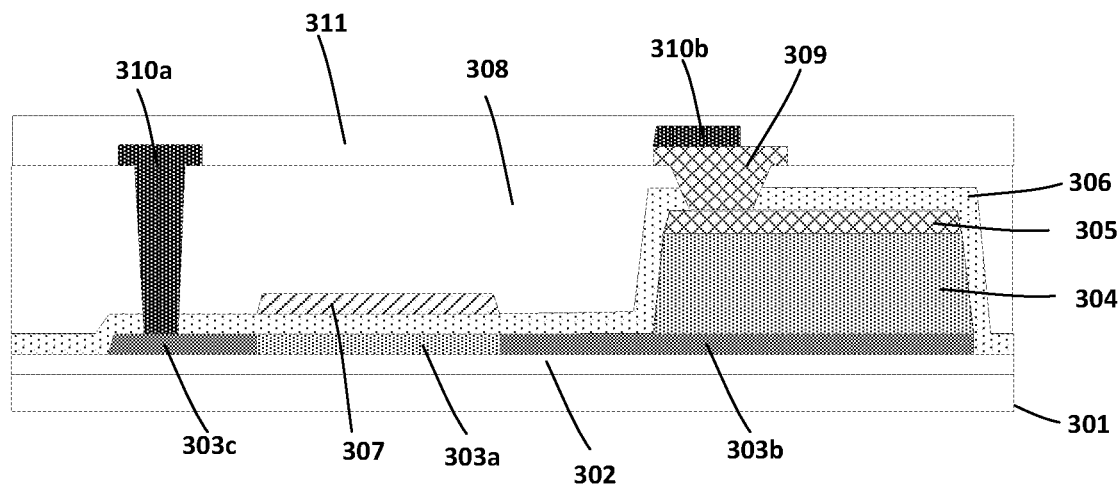
FIG. 5 is yet another schematic view showing the fingerprint identification module according to an embodiment of the present disclosure.

As shown in FIG. 5, the connection electrode 303b is reused as the lower electrode of the photosensitive sensor.

In the embodiments of the present disclosure, when the connection electrode is reused as the lower electrode of the photosensitive sensor, it is able to omit the masking process for separately forming the lower electrode of the photosensitive sensor, thereby to reduce the quantity of masks for the manufacture of the fingerprint identification module, and reduce the thickness of the fingerprint identification module.

In some other embodiments of the present disclosure, the connection electrode is not reused as the lower electrode of the photosensitive sensor, but arranged at a same layer as, and connected to, the lower electrode of the photosensitive sensor. Through this structure, it is also able to reduce the thickness of the fingerprint identification module.

In a possible embodiment of the present disclosure, prior to forming the semiconductor layer pattern, the method further includes a step S0c of forming a gate metal layer pattern, and the gate metal layer pattern includes a gate electrode of the TFT and the lower electrode of the photosensitive sensor.

Figure 6:
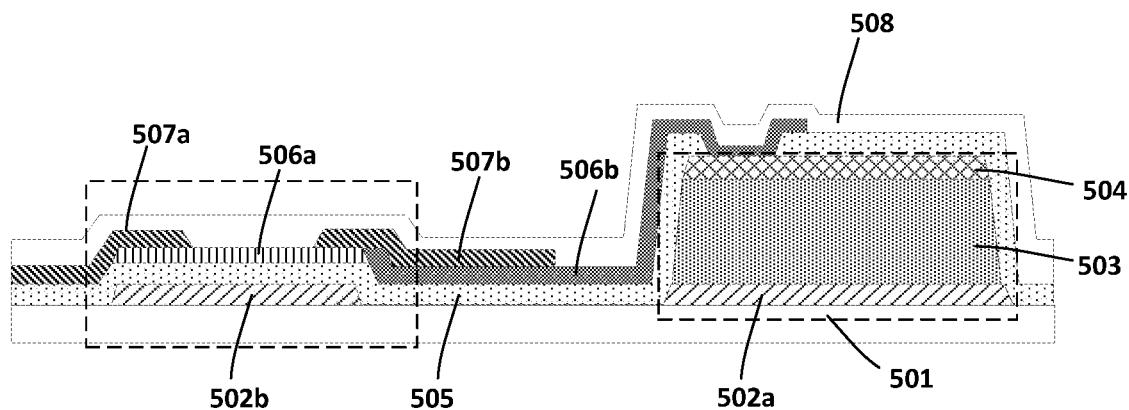
FIG. 6 is still yet another schematic view showing the fingerprint identification module according to an embodiment of the present disclosure.

As shown in FIG. 3, the gate electrode 102b of the TFT is arranged at a same layer, and made of a same material, as the lower electrode 102a of the photosensitive sensor, i.e., the gate electrode and the lower electrode are formed through a single patterning process. As shown in FIG. 4, the gate electrode 202b of the TFT is arranged at a same layer, and made of a same material, as the lower electrode 202a of the photosensitive sensor, i.e., the gate electrode and the lower electrode are formed through a single patterning process. As shown in FIG. 6, the gate electrode 502b of the TFT is arranged at a same layer, and made of a same material, as the lower electrode 502a of the photosensitive sensor, i.e., the gate electrode and the lower electrode are formed through a single patterning process.

In the embodiments of the present disclosure, the gate electrode of the TFT and the lower electrode of the photosensitive sensor are formed through a single patterning process, so it is able to further reduce the quantity of masks for the manufacture of the fingerprint identification module, and reduce the thickness of the fingerprint identification module.

In some embodiments of the present disclosure, subsequent to forming the semiconductor layer pattern, the method further includes S13a of forming a source/drain metal layer pattern, the source/drain metal layer pattern merely includes a source electrode, and the connection electrode is connected to the active layer and reused as a drain electrode of the TFT.

As shown in FIG. 3, the connection electrode 106b is reused as the drain electrode of the TFT. As shown in FIG. 4, the connection electrode 205b is reused as both the drain electrode of the TFT and the upper electrode of the photosensitive sensor. As shown in FIG. 5, the connection electrode 303b is reused as both the drain electrode of the TFT and the lower electrode of the photosensitive sensor.

In some embodiments of the present disclosure, subsequent to forming the semiconductor layer pattern, the method further includes forming the source/drain metal layer pattern, the source/drain metal layer pattern includes the source electrode and the drain electrode, and the connection electrode is connected to the active layer and the drain electrode.

As shown in FIG. 6, the source/drain metal layer pattern includes the source electrode 507a and the drain electrode 507b, and the connection electrode 506b is connected to the active layer 506a and the drain electrode 507b.

In the embodiments of the present disclosure, it is able to reduce a resistance of the drain electrode.

In some other embodiments of the present disclosure, the active layer of the TFT is not connected to the connection electrode, and the connection electrode is connected to the drain electrode.

Figure 9:
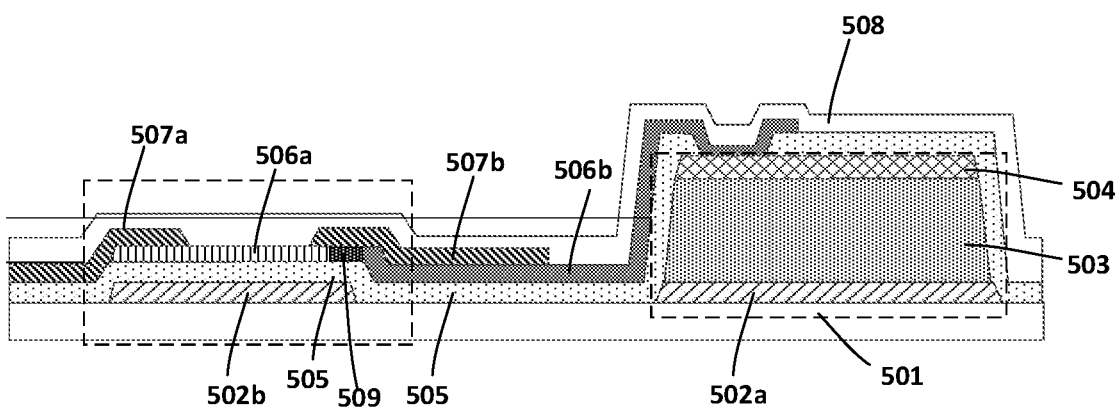
FIG. 9 is still yet another schematic view showing the fingerprint identification module according to an embodiment of the present disclosure.

In other words, subsequent to forming the semiconductor layer pattern, the method further includes a step S13c of forming the source/drain metal layer pattern, the source/drain metal layer pattern includes the source electrode and the drain electrode, and the connection electrode is separated from the active layer and connected to the drain electrode. As shown in FIG. 9, the connection electrode is separated from the active layer through an insulation structure 509.

In a possible embodiment of the present disclosure, the semiconductor layer pattern is made of a metal oxide semiconductor, e.g., Indium Gallium Zinc Oxide (IGZO), Indium Tin Zinc Oxide (ITZO), or Indium Zinc Oxide (IZO), so as to improve the performance of the TFT.

In the embodiments of the present disclosure, for the conductor-formation treatment, the semiconductor pattern is subjected to plasma treatment using $NH_3$ or $H_2$, or subjected to ion doping treatment.

The method for manufacturing the fingerprint identification module will be described illustratively hereinafter.

In some embodiments of the present disclosure, the method for manufacturing the fingerprint identification module includes the following steps.

Figure 7A:
FIGS. 7A to 7G are schematic views showing the manufacture of the fingerprint identification module according to an embodiment of the present disclosure.

Step S21: forming a gate metal layer on a substrate 101 and patterning the gate metal layer to form the gate electrode 102b of the TFT and the lower electrode 102a of the photosensitive sensor, as shown in FIG. 7A.

In the embodiments of the present disclosure, the substrate is a glass substrate or a flexible Polyimide (PI) substrate, and the gate metal layer is made of Al, Mo, AlNd, Cu or MoNb.

In this step, one mask (mask 1) is adopted.

Figure 7B:
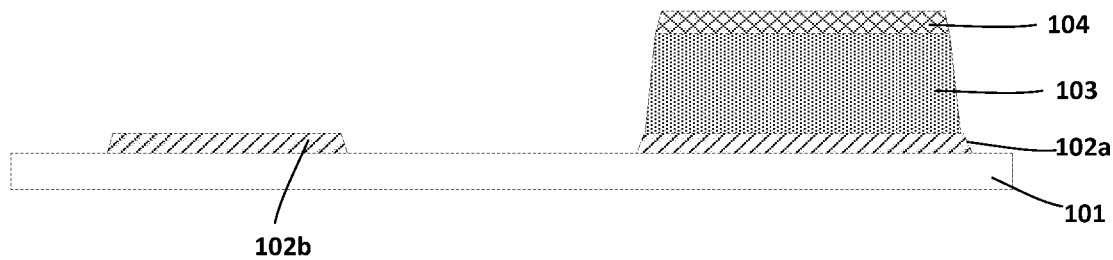

Step S22: performing a PIN process on the lower electrode 102a and patterning, so as to form the PIN layer 103 and the upper electrode 104 of the photosensitive sensor, as shown in FIG. 7B.

The PIN layer 103 includes an intrinsic amorphous silicon layer having a thickness of 600 nm to 1200 nm and a P-doped amorphous silicon layer having a thickness of 10 nm to 100 nm. The upper electrode 104 is made of a transparent metal oxide, e.g., Indium Tin Oxide (ITO), and has a thickness of 20 nm to 80 nm.

In this step, two masks (masks 2 and 3) are adopted.

Figure 7C:
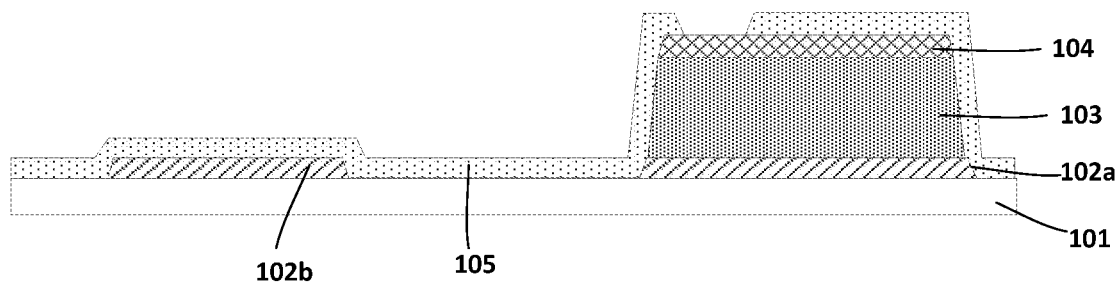

Step S23: depositing a gate insulation layer (GI layer) and forming a via-hole in the gate insulation layer at a position above the upper electrode 104, as shown in FIG. 7C.

The gate insulation layer is made of $SiO_2$, or two layers of SiNx and $SiO_2$ respectively, and has a thickness of 200 nm to 400 nm.

In this step, one mask (mask 4) is adopted.

Figure 7D:
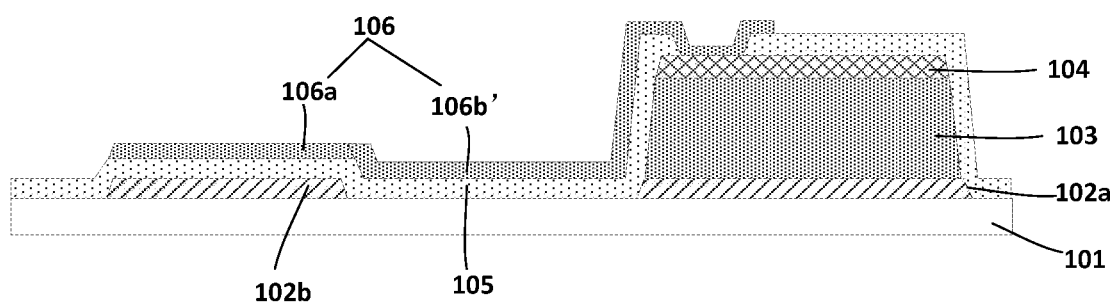

Step S24: forming the semiconductor layer pattern 106. The semiconductor pattern 106 includes a first semiconductor pattern 106a and a second semiconductor pattern 106b', and the first semiconductor pattern 106a is used as the active layer of the TFT, as shown in FIG. 7D.

The semiconductor layer pattern 106 is made of a metal oxide semiconductor material, e.g., IGZO, ITZO or IZO, in an amorphous state, a crystalline state, or two layers of the amorphous state and the crystalline state respectively, and has a thickness of 30 nm to 70 nm.

In this step, one mask (mask 5) is adopted.

Figure 7E:
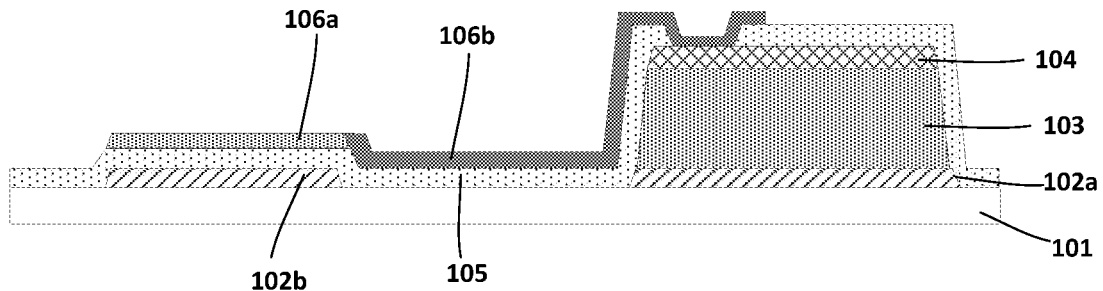

Step S25: subjecting the second semiconductor pattern 1062 to the conductor-formation treatment to form the connection electrode 106b, as shown in FIG. 7E.

For the conductor-formation treatment, the semiconductor pattern is subjected to plasma treatment using $NH_3$ or $H_2$, or subjected to ion-doping treatment.

In this step, one mask (mask 6) is adopted.

Figure 7F:
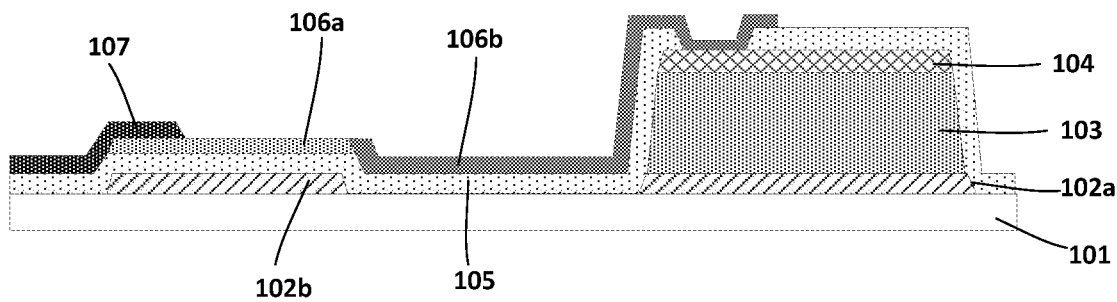

Step S26: forming a source/drain metal layer pattern. The source/drain metal layer pattern merely includes a source electrode 107, and no source/drain metal layer pattern is formed on the connection electrode 106b, as shown in FIG. 7F.

The source/drain metal layer is made of Al, Mo, AlNd, Cu or MoNb, or an alloy of two or more of Al, Mo, AlNd, Cu and MoNb, and has a thickness of 300 nm to 500 nm.

In this step, one mask (mask 7) is adopted.

Figure 7G:
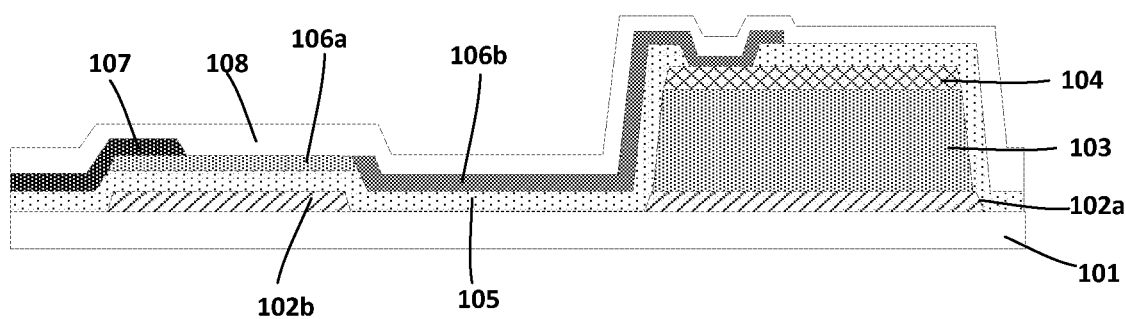

Step S27: forming a passivation (PVX) layer 108, as shown in FIG. 7G.

The PVX layer is made of $SiO_2$, SiON, or both, and has a thickness of 300 Å to 400 Å.

In some embodiments of the present disclosure, another method for manufacturing the fingerprint identification module includes the following steps.

Steps S31 to S35 are the same as S21 to S25 mentioned hereinabove, and thus will not be particularly further defined herein.

Figure 8A:
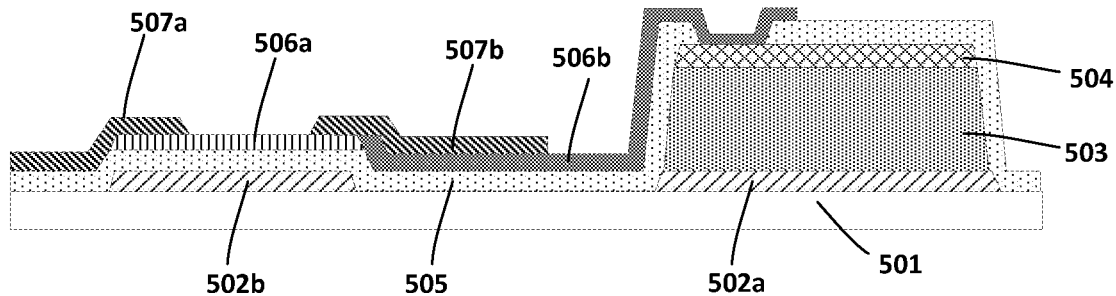
FIGS. 8A to 8B are schematic views showing the manufacture of the fingerprint identification module according to an embodiment of the present disclosure.

Step S36: forming the source/drain metal layer pattern, the source/drain metal layer pattern merely including a source electrode 507a and a drain electrode 507b, as shown in FIG. 8A.

The source/drain metal layer is made of Al, Mo, AlNd, Cu or MoNb, or an alloy of two or more of Al, Mo, AlNd, Cu and MoNb, and has a thickness of 300 nm to 500 nm.

In the embodiments of the present disclosure, the drain electrode 507b is formed on the connection electrode 506b, so as to reduce the resistance of the connection electrode.

Figure 8B:
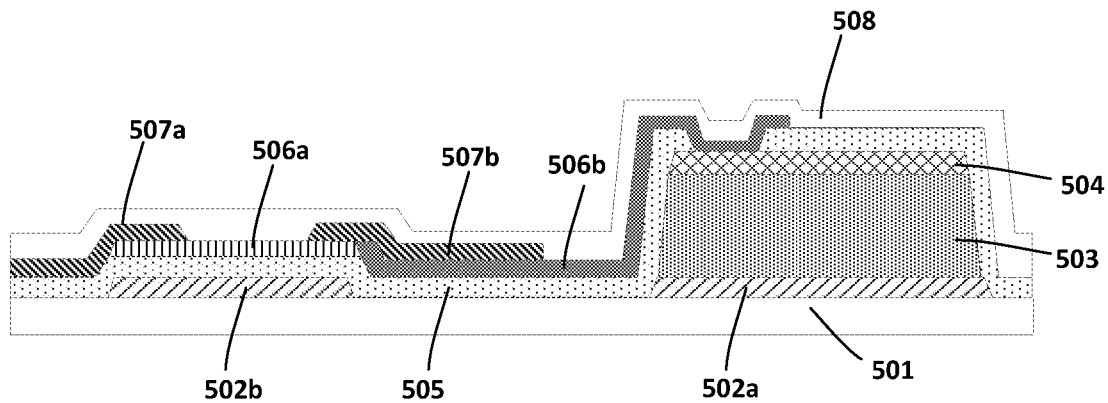

Step S37: forming a passivation (PVX) layer 508, as shown in FIG. 8B.

The PVX layer is made of $SiO_2$, SiON, or both, and has a thickness of 300 Å to 400 Å.

According to the embodiments of the present disclosure, the first semiconductor pattern for forming the active layer of the TFT and the second semiconductor pattern for forming the connection electrode are formed simultaneously through a single patterning process, so as to reduce the quantity of masks for the fingerprint identification module, thereby to reduce the manufacture cost. In addition, the photosensitive sensor is formed before the gate insulation layer, the active layer, the source/drain metal pattern and the PVX layer associated with the TFT are formed, so it is able to prevent the characteristic of the TFT from being adversely affected by the process for forming the photosensitive sensor. The semiconductor layer pattern is made of a transparent metal oxide, so as to enable the connection electrode to be a transparent electrode, thereby to increase a light-receiving area of the photosensitive sensor. The lower electrode of the photosensitive sensor and the gate electrode of the TFT share a same metal layer, so it is able to reduce the quantity of film layers. Further, as compared with a manufacture process in the related art, seven masks are used in the embodiments of the present disclosure, it is able to remarkably shorten the manufacture process.

The present disclosure further provides in some embodiments a fingerprint identification module, which includes a TFT, a photosensitive sensor, and a connection electrode configured to connect the TFT to the photosensitive sensor. The TFT includes an active layer formed through a same semiconductor layer pattern as the connection electrode, the semiconductor layer pattern includes a first semiconductor pattern and a second semiconductor pattern, the first semiconductor pattern is used as the active layer, and the second semiconductor pattern is used as the connection electrode after conductor-formation treatment.

According to the embodiments of the present disclosure, the semiconductor pattern for forming the active layer of the TFT and the semiconductor pattern for forming the connection electrode are formed simultaneously through a single patterning process, so as to reduce the quantity of masks for the fingerprint identification module, thereby to reduce the manufacture cost.

In a possible embodiment of the present disclosure, the photosensitive sensor includes a lower electrode, a PIN layer and an upper electrode, and the connection electrode is lapped onto the upper electrode.

In a possible embodiment of the present disclosure, the semiconductor layer pattern is made of a transparent semiconductor material, so that the connection electrode is a transparent electrode. At this time, even when the connection electrode is lapped onto the photosensitive sensor, the light-receiving area of the photosensitive sensor is not adversely affected.

In a possible embodiment of the present disclosure, the transparent semiconductor material is a metal oxide semiconductor material. When the active layer is made of the metal oxide semiconductor material, it is able to improve the characteristic of the TFT.

As shown in FIG. 3, the fingerprint identification module includes a substrate 101, a gate metal layer pattern, a PIN layer 103, an upper electrode 104, a gate insulation layer 105, an active layer 106a, a connection electrode 106b, a source/drain metal layer pattern, and a PVX layer 108.

The substrate is a glass substrate or a flexible PI substrate.

The gate metal layer pattern includes a gate electrode 102b of the TFT and a lower electrode 102a of the photosensitive sensor. The gate metal layer is made of Al, Mo, AlNd, Cu or MoNb.

The PIN layer 103 includes an intrinsic amorphous silicon layer having a thickness of 600 nm to 1200 nm and a P-doped amorphous silicon layer having a thickness of 10 nm to 100 nm.

The upper electrode 104 is made of a transparent metal oxide, e.g., ITO, and has a thickness of 20 nm to 80 nm.

A via-hole is formed in the gate insulation layer 105 at a position above the upper electrode 104. The gate insulation layer is made of $SiO_2$, or both SiNx and $SiO_2$, and has a thickness of 200 nm to 400 nm.

The active layer 106a and the connection electrode 106b are formed through a same semiconductor layer pattern. The semiconductor layer pattern includes a first semiconductor pattern and a second semiconductor pattern, the first semiconductor pattern is used as the active layer 106a, and the second semiconductor pattern is used as the connection electrode 106b after conductor-formation treatment. The connection electrode 106b is lapped onto the upper electrode 104 of the photosensitive sensor through the via-hole in the gate insulation layer 105, and the connection electrode 106 is a transparent electrode. The semiconductor layer pattern is made of a metal oxide semiconductor material, e.g., IGZO, ITZO or IZO, in an amorphous state, a crystalline state, or two layers of the amorphous state and the crystalline state respectively, and has a thickness of 30 nm to 70 nm.

The source/drain metal layer pattern includes a source electrode 107. The source/drain metal layer is made of Al, Mo, AlNd, Cu or MoNb, or an alloy of two or more of Al, Mo, AlNd, Cu and MoNb, and has a thickness of 300 nm to 500 nm.

The PVX layer 108 is made of $SiO_2$, SiON, or both, and has a thickness of 300 Å to 400 Å.

In a possible embodiment of the present disclosure, the connection electrode is a transparent electrode, and reused as the upper electrode of the photosensitive sensor.

In a possible embodiment of the present disclosure, the semiconductor layer pattern is made of a transparent metal oxide semiconductor material. When the active layer is made of a metal oxide semiconductor material, it is able to improve the characteristic of the TFT.

As shown in FIG. 4, the fingerprint identification module includes a substrate 201, a gate metal layer pattern, a PIN layer 203, a gate insulation layer 204, an active layer 205a, a connection electrode 205b, a source/drain metal layer pattern, and a PVX layer 207.

The substrate is a glass substrate or a flexible PI substrate.

The gate metal layer pattern includes a gate electrode 202b of the TFT and a lower electrode 202a of the photosensitive sensor. The gate metal layer is made of Al, Mo, AlNd, Cu or MoNb.

The PIN layer 203 includes an intrinsic amorphous silicon layer having a thickness of 600 nm to 1200 nm and a P-doped amorphous silicon layer having a thickness of 10 nm to 100 nm.

A via-hole is formed in the gate insulation layer 204 at a position above the PIN layer 203. The gate insulation layer 204 is made of $SiO_2$, or both SiNx and $SiO_2$, and has a thickness of 200 nm to 400 nm.

The active layer 205a and the connection electrode 205b are formed through a same semiconductor layer pattern. The semiconductor layer pattern includes a first semiconductor pattern and a second semiconductor pattern, the first semiconductor pattern is used as the active layer 205a, and the second semiconductor pattern is used as the connection electrode 205b after conductor-formation treatment. The connection electrode 205b is a transparent electrode and reused as the upper electrode of the photosensitive sensor. The semiconductor layer pattern is made of a metal oxide semiconductor material, e.g., IGZO, ITZO or IZO, in an amorphous state, a crystalline state or two layers of the amorphous state and the crystalline state respectively, and has a thickness of 30 nm to 70 nm.

The source/drain metal layer pattern includes a source electrode 206. The source/drain metal layer is made of Al, Mo, AlNd, Cu or MoNb, or an alloy of two or more of Al, Mo, AlNd, Cu and MoNb, and has a thickness of 300 nm to 500 nm.

The PVX layer 207 is made of $SiO_2$, SiON, or both, and has a thickness of 300 Å to 400 Å.

In the embodiments of the present disclosure, the connection electrode is lapped onto or reused as the upper electrode of the photosensitive sensor, and in some other embodiments of the present disclosure, the connection electrode is connected to, or reused as, the lower electrode of the photosensitive sensor, which will be described hereinafter.

In a possible embodiment of the present disclosure, the connection electrode is reused as the lower electrode of the photosensitive sensor.

As shown in FIG. 5, the fingerprint identification module includes a substrate 301, a buffer layer 302, an active layer 303a, a connection electrode 303b, a source connecting region 303c, a PIN layer 304, an upper electrode 305, a gate insulation layer 306, a gate metal layer pattern, and interlayer dielectric layer (ILD) 308, a first connecting member 309, a source/drain metal layer pattern, and a PVX layer 311.

The substrate 301 is a glass substrate or a flexible PI substrate.

The active layer 303a, the connection electrode 303b and the source connecting region 303c are formed through a same semiconductor layer pattern. The semiconductor layer pattern includes a first semiconductor pattern, a second semiconductor pattern and a third semiconductor pattern. The first semiconductor pattern is used as the active layer 303a, the second semiconductor pattern is used as the connection electrode 303b after conductor-formation treatment, and the third semiconductor pattern is used as the source connecting region 303c after conductor-formation treatment. The connection electrode 303b is reused as a drain electrode of the TFT and a lower electrode of the photosensitive sensor. The semiconductor layer pattern is made of a metal oxide semiconductor material, e.g., IGZO, ITZO or IZO, in an amorphous state, a crystalline state, or two layers of the amorphous state and the crystalline state respectively, and has a thickness of 30 nm to 70 nm.

The PIN layer 304 includes an intrinsic amorphous silicon layer having a thickness of 600 nm to 1200 nm and a P-doped amorphous silicon layer having a thickness of 10 nm to 100 nm.

The upper electrode 305 is made of a transparent metal oxide, e.g., ITO, and has a thickness of 20 nm to 80 nm.

A via-hole is formed in the gate insulation layer 306 at a position above the upper electrode 305. The gate insulation layer 204 is made of $SiO_2$, or both SiNx and $SiO_2$, and has a thickness of 200 nm to 400 nm.

The gate metal layer pattern includes a gate electrode 307 of the TFT, and it is made of Al, Mo, AlNd, Cu or MoNb.

A via-hole is formed in the interlayer dielectric layer 308 at a position above the via-hole in the gate insulation layer 306 and communicates with the via-hole in the gate insulation layer 306.

The first connection member 309 is connected to the upper electrode 305 through the via-hole in the interlayer dielectric layer 308 and the gate insulation layer 306.

The source/drain metal layer pattern includes a source electrode 310a and a second connection member 310b. The source/drain metal layer pattern is made of Al, Mo, AlNd, Cu or MoNb, or an alloy of two or more of Al, Mo, AlNd, Cu and MoNb, and has a thickness of 300 nm to 500 nm. In some embodiments of the present disclosure, no first connection member 309 is provided, and the second connection member 310b is directly connected to the upper electrode 305 through the via-hole in the interlayer dielectric layer 308 and the gate insulation layer 306.

The PVX layer 311 is made of $SiO_2$, SiON, or both, and has a thickness of 300 Å to 400 Å.

In the embodiments of the present disclosure, when the connection electrode is reused as the lower electrode of the photosensitive sensor, it is able to omit the masking process for separately forming the lower electrode of the photosensitive sensor, thereby to reduce the quantity of masks for the manufacture of the fingerprint identification module, and reduce the thickness of the fingerprint identification module.

In some other embodiments of the present disclosure, the connection electrode is not reused as the lower electrode of the photosensitive sensor, but arranged at a same layer as, and connected to, the lower electrode of the photosensitive sensor. Through this structure, it is also able to reduce the thickness of the fingerprint identification module.

In some embodiments of the present disclosure, the TFT includes a gate electrode arranged at a same layer, and made of a same material, as the lower electrode of the photosensitive sensor, as shown in FIGS. 3, 4 and 6. In FIG. 3, the gate electrode 102b of the TFT is arranged at a same layer, and made of a same material, as the lower electrode 102a of the photosensitive sensor, and the gate electrode and the lower electrode are formed through a single patterning process. In FIG. 4, the gate electrode 202b of the TFT is arranged at a same layer, and made of a same material, as the lower electrode 202a of the photosensitive sensor, and the gate electrode and the lower electrode are formed through a single patterning process. In FIG. 6, the gate electrode 502b of the TFT is arranged at a same layer, and made of a same material, as the lower electrode 502a of the photosensitive sensor, and the gate electrode and the lower electrode are formed through a single patterning process.

In the embodiments of the present disclosure, the gate electrode of the TFT and the lower electrode of the photosensitive sensor are formed through a single patterning process, so it is able to further reduce the quantity of masks for the manufacture of the fingerprint identification module, and reduce the thickness of the fingerprint identification module.

In some embodiments of the present disclosure, the connection electrode is connected to the active layer, and reused as the drain electrode of the TFT. As shown in FIG. 3, the connection electrode 106b is reused as the drain electrode of the TFT. As shown in FIG. 4, the connection electrode 205b is reused as the drain electrode of the TFT and the upper electrode of the photosensitive sensor. As shown in FIG. 5, the connection electrode 303b is reused as the drain electrode of the TFT and the lower electrode of the photosensitive sensor.

In some embodiments of the present disclosure, the connection electrode is connected to the active layer and the drain electrode of the TFT. As shown in FIG. 6, the source/drain metal layer pattern includes the source electrode 507a and the drain electrode 507b, and the connection electrode 506b is connected to the active layer 506a and the drain electrode 507b. Through this structure, it is able to reduce a resistance of the drain electrode.

In some embodiments of the present disclosure, the connection electrode is separated from the active layer, and the drain electrode of the TFT is connected to the connection electrode.

In a possible embodiment of the present disclosure, the semiconductor layer pattern is made of a metal oxide semiconductor material, e.g., IGZO, ITZO or IZO, so as to improve the performance of the TFT.

The present disclosure further provides in some embodiments a display substrate including the above-mentioned fingerprint identification module.

The present disclosure further provides in some embodiments a display device including the above-mentioned display substrate.

The embodiments of the present disclosure are described above with reference to the accompanying drawings, but the present disclosure is not limited to the above-mentioned specific embodiments. The above-mentioned specific embodiments are only illustrative and not restrictive. Under the teaching of the present disclosure, a person skilled in the art may implement many forms without departing from the principle of the present disclosure and the protection scope of the claims, which also fall within the scope of the present disclosure.

What is claimed is:

1. A fingerprint identification module, comprising:
a thin film transistor (TFT), a photosensitive sensor, and a connection electrode configured to connect the TFT to the photosensitive sensor,
wherein the TFT comprises an active layer;
the active layer and the connection electrode are formed through a same semiconductor layer pattern, the semiconductor layer pattern comprises a first semiconductor pattern and a second semiconductor pattern, the first semiconductor pattern is used as the active layer, and the second semiconductor pattern is subjected to conductor-formation treatment and used as the connection electrode;
wherein the TFT comprises a gate electrode, and the gate electrode is arranged at a same layer, and made of a same material, as the first electrode of the photosensitive sensor.

2. The fingerprint identification module according to claim 1, wherein the photosensitive sensor comprises a first electrode, a PIN layer and a second electrode, wherein the first electrode, the PIN layer and the second electrode are laminated one on another on a substrate sequentially in that order, and the connection electrode is lapped onto the second electrode.

3. The fingerprint identification module according to claim 2, further comprising:
a gate insulation layer, wherein a portion of the gate insulation layer covers a surface of the second electrode distal to the first electrode; and
a via-hole, wherein the via-hole is formed in the portion of the gate insulation layer and penetrates through the gate insulation layer,
wherein the connection electrode is in contact with the second electrode through the via-hole.

4. The fingerprint identification module according to claim 2, wherein the connection electrode is a transparent electrode.

5. The fingerprint identification module according to claim 1, wherein the photosensitive sensor comprises a first electrode and a PIN layer laminated one on another on a substrate sequentially in that order, and the connection electrode is a transparent electrode and reused as a second electrode of the photosensitive sensor.

6. The fingerprint identification module according to claim 5, wherein a portion of the connection electrode is arranged at a surface of the PIN layer distal to the first electrode.

7. The fingerprint identification module according to claim 1, wherein
the connection electrode is connected to the active layer and reused as a drain electrode of the TFT; or
the connection electrode is connected to the active layer and the drain electrode of the TFT; or
the connection electrode is separated from the active layer and connected to the drain electrode of the TFT.

8. A method for manufacturing a fingerprint identification module, configured to manufacture the fingerprint identification module according to claim 1, wherein the method comprises:
forming the semiconductor layer pattern through a single patterning process; and
subjecting the second semiconductor pattern to conductor-formation treatment to form the connection electrode;
the method further comprises, prior to forming the semiconductor layer pattern,
forming a gate metal layer pattern, wherein the gate metal layer pattern comprises a gate electrode of the TFT and the first electrode of the photosensitive sensor.

9. The method according to claim 8, further comprising: prior to forming the semiconductor layer pattern,
forming a first electrode, a PIN layer and a second electrode of the photosensitive sensor on a substrate sequentially in that order, wherein the connection electrode is lapped onto the second electrode.

10. The method according to claim 9, further comprising: subsequent to forming the first electrode, the PIN layer and the second electrode of the photosensitive sensor sequentially on the substrate sequentially in that order,
forming a gate insulation layer, wherein a portion of the gate insulation layer covers a surface of the second electrode distal to the first electrode;
forming in the portion of the gate insulation layer a via-hole that penetrates through the gate insulation layer,
wherein the connection electrode is in contact with the second electrode through the via-hole.

11. The method according to claim 9, wherein the connection electrode is a transparent electrode.

12. The method according to claim 8, further comprising: subsequent to forming the semiconductor layer pattern,
forming a source/drain metal layer pattern, the source/drain metal layer pattern merely comprising a source electrode, the connection electrode being connected to the active layer and reused as a drain electrode of the TFT; or
forming the source/drain metal layer pattern, the source/drain metal layer pattern comprising the source electrode and the drain electrode, the connection electrode being connected to the active layer and the drain electrode; or
forming the source/drain metal layer pattern, the source/drain metal layer pattern comprising the source electrode and the drain electrode, the connection electrode being separated from the active layer and connected to the drain electrode.

13. A display substrate, comprising a fingerprint identification module, wherein the fingerprint identification module comprises:
a thin film transistor (TFT), a photosensitive sensor, and a connection electrode configured to connect the TFT to the photosensitive sensor,
wherein the TFT comprises an active layer;
the active layer and the connection electrode are formed through a same semiconductor layer pattern, the semiconductor layer pattern comprises a first semiconductor pattern and a second semiconductor pattern, the first semiconductor pattern is used as the active layer, and the second semiconductor pattern is subjected to conductor-formation treatment and used as the connection electrode;
wherein the TFT comprises a gate electrode, and the gate electrode is arranged at a same layer, and made of a same material, as the first electrode of the photosensitive sensor.

14. A display device, comprising the display substrate according to claim 13.

\* \* \* \* \*